United States Patent [19]

Berthold

[11] 4,264,256
[45] Apr. 28, 1981

[54] APPARATUS FOR REMOVING BULK MATERIAL FROM A DUMP

[75] Inventor: Heinz Berthold, St. Ingbert-Rohrbach, Fed. Rep. of Germany

[73] Assignee: Pohlig-Heckel-Bleichert Vereinigte Maschinenfabriken Aktiengesellschaft, Koln-Zollstock, Fed. Rep. of Germany

[21] Appl. No.: 950,311

[22] Filed: Oct. 10, 1978

[51] Int. Cl.³ .............................................. B65G 65/28
[52] U.S. Cl. ..................................... 414/133; 198/519
[58] Field of Search ...................... 414/133, 145, 304; 198/506, 519; 37/DIG. 16, 189, 190, 191 A, 191 R, 192 R, 192 A

[56] References Cited

U.S. PATENT DOCUMENTS

| 3,788,446 | 1/1974 | Postel-Vinay .................. 414/133 X |
| 4,026,423 | 5/1977 | Schade et al. ......................... 414/133 |

FOREIGN PATENT DOCUMENTS

| 187937 | 4/1906 | Fed. Rep. of Germany . |
| 1032170 | 11/1958 | Fed. Rep. of Germany . |
| 1162282 | 1/1964 | Fed. Rep. of Germany . |
| 1481303 | 6/1969 | Fed. Rep. of Germany . |
| 2155355 | 5/1976 | Fed. Rep. of Germany . |
| 2541024 | 3/1977 | Fed. Rep. of Germany ........... 198/519 |
| 2060211 | 3/1975 | France . |
| 787029 | 11/1957 | United Kingdom ..................... 414/133 |
| 1225569 | 3/1971 | United Kingdom . |

Primary Examiner—Frank E. Werner
Attorney, Agent, or Firm—Haseltine and Lake

[57] ABSTRACT

A bridge is movable transversely to its longitudinal direction. A carrier extends in the longitudinal direction and is mounted on the bridge to be movable in said longitudinal direction. An inclined pole is connected to the carrier and extends upwardly to a top end of the pole from a point of the carrier which is nearer to the mid-point than to each end point of the carrier. A plurality of lower rope holders are provided on the carrier on opposite sides of the mid-point and spaced apart in the longitudinal direction. A plurality of ropes are associated with and connected to respective ones of the lower rope holders. A plurality of vertically spaced apart upper rope holders are secured to the pole. One of the upper rope holders is disposed near the top end. Each of the upper rope holders is connected to two of the ropes which are connected to lower rope holders provided on opposite sides of the mid-point in such a manner that none of the ropes crosses another between the upper and lower rope holders. Drive devices are provided for reciprocating the carrier in the longitudinal direction.

16 Claims, 3 Drawing Figures

APPARATUS FOR REMOVING BULK MATERIAL FROM A DUMP

BACKGROUND OF THE INVENTION

This invention relates to a scraper-conveyor apparatus for use in dumps, mixed-bed installations or the like, comprising a bridge, which is movable to be close to an end face of the dump and extends parallel to and approximately throughout the length of the base of the dump end face and carries a transverse conveyor, particularly an endless scarper chain, further comprising scraping means, which include a frame, that is connected to the bridge, and scraping ropes, which are connected to said frame and reciprocable parallel to the dump end face by drive means.

The known slope scraper-conveyor apparatus can be divided into three groups, namely:

(a) Slope scraper-conveyor apparatus in which the scraping means comprise a rigid harrow having rigid teeth and substantially covering the dump end face which is to be scraped. That harrow is reciprocated over a short distance along the dump end face;

(b) Slope scraper-conveyor apparatus in which the scraping means also comprise a rigid harrow which is set with rigid teeth but is narrow and must be moved over a distance corresponding to the length of the base of the dump end face;

(c) Slope scraper-conveyor apparatus having scraping ropes which at their upper end are secured to a frame and at their lower end are secured to a slide. The known slope scraper-conveyor apparatus of that kind comprise only a few ropes, which are tensioned by counterweights. For this reason the slide must be reciprocated virtually throughout the length of the dump end face.

The slope scraper-conveyor apparatus of groups (a) and (b) are not satisfactory in operation because when used with dumped materials which do not easily trickle because they are moist and tend to cake the teeth of the harrows form only grooves or narrow trenches in the dump end face and the resulting layers break off as soon as the grooves or trenches have a certain depth. As a result, the material is scraped off in a very irregular manner. This is highly undesirable because the transverse conveyors, which serve for the lateral conveyance of the material and in most cases consist of endless scraper chains, are then irregularly loaded with layers varying in thickness. Because with slope scraper-conveyor apparatus of group (b) the narrow harrow must move a long distance to act throughout the dump end face, the rate at which material is scraped off is unsatisfactorily low. A more uniform scraping action is performed by the slope scraper-conveyor apparatus of group (c) but they also do not act uniformly when handling dumped material which does not trickle easily and they cannot scrape off material at a sufficiently high rate because the movable rope ends must move other long distances. Besides, the reciprocating ropes are moved over long distances in the direction of conveyance of the transverse conveyor and opposite thereto in alternation so that the flight spaces of the conveyor are irregularly filled.

SUMMARY OF THE INVENTION

It is an object of the invention to provide a slope scraper-conveyor apparatus in which the advantages of scraping ropes are preserved and which can scrape bulk material from a dump at a rate which is uniform or varies only slightly so that a uniform loading of the transverse conveyor is ensured. In a slope scraper-conveyor apparatus of the type defined first hereinbefore this is accomplished according to the invention in that the frame of the scraping means comprises a carrier, which is parallel to the bridge and mounted to be movable in the longitudinal direction of the bridge and adapted to be reciprocated by the drive means, and a pole, which protrudes upwardly from the carrier at a point that is nearer to the middle than to the ends of the carrier and has a tip extending above the top of the dump end face, a number of tensioning devices are secured to the pole near its tip and are spaced predetermined distances apart, each of the two carrier sections which extend from the fixing point of the pole to one end of the carrier are provided at points spaced predetermined distances apart with fixing means for fixing the ends of the rope, each fixing means provided on the two carrier sections, inclusive of the ends thereof, are connected by respective ropes to respective means of the tensioning devices, and the ropes form an array which is free of crossings. The pole is desirably connected to the carrier by at least one strut, preferably by means of two struts, which are secured to respective sections of the carrier. In a preferred embodiment the joint between the pole and the carrier is spaced by not more than one tenth of the length of the pole and the two struts extend from one and the same point of the pole and are connected to the carrier adjacent to those rope-fixing means which are nearest to respective ends of the carrier. The rope-fixing means provided on each section of the carrier are spaced at least approximately equal distances apart. The two ropes extending from each tensioning device may consist of sections of a rope which is trained around the tensioning device. Specifically, the rope may be slung in one turn around the tensioning device. In many cases it is desirable to enable an adjustment of the inclination of the scraping means relative to the horizontal and an adaptation of said inclination to the intersecting angle of the bulk material which is to be cleared. This is enabled by an embodiment in which the carrier is mounted on the bridge to be longitudinally and pivotally movable and the bridge is provided with an approximately vertical, rigid stand, and the pole is connected to the end of the stand by means of a strut or rope which is preferably adjustable in length. When the length of the strut or rope remains unchanged during operation, the scraping means are caused to perform a pivotal movement, which is derived from the reciprocating movement of the scraping means. This is desirable for scraping off material. That operation can be facilitated in that the frame of the scraping means is connected to a vibrator. In some cases it will be desirable to interconnect at least some ropes by transverse toothed bars.

BRIEF DESCRIPTION OF THE DRAWINGS

Embodiments of the invention will be explained more fully hereinafter by way of example with reference to the drawings, in which.

DESCRIPTION OF THE PREFERRED EMBODIMENT

Figure 1:
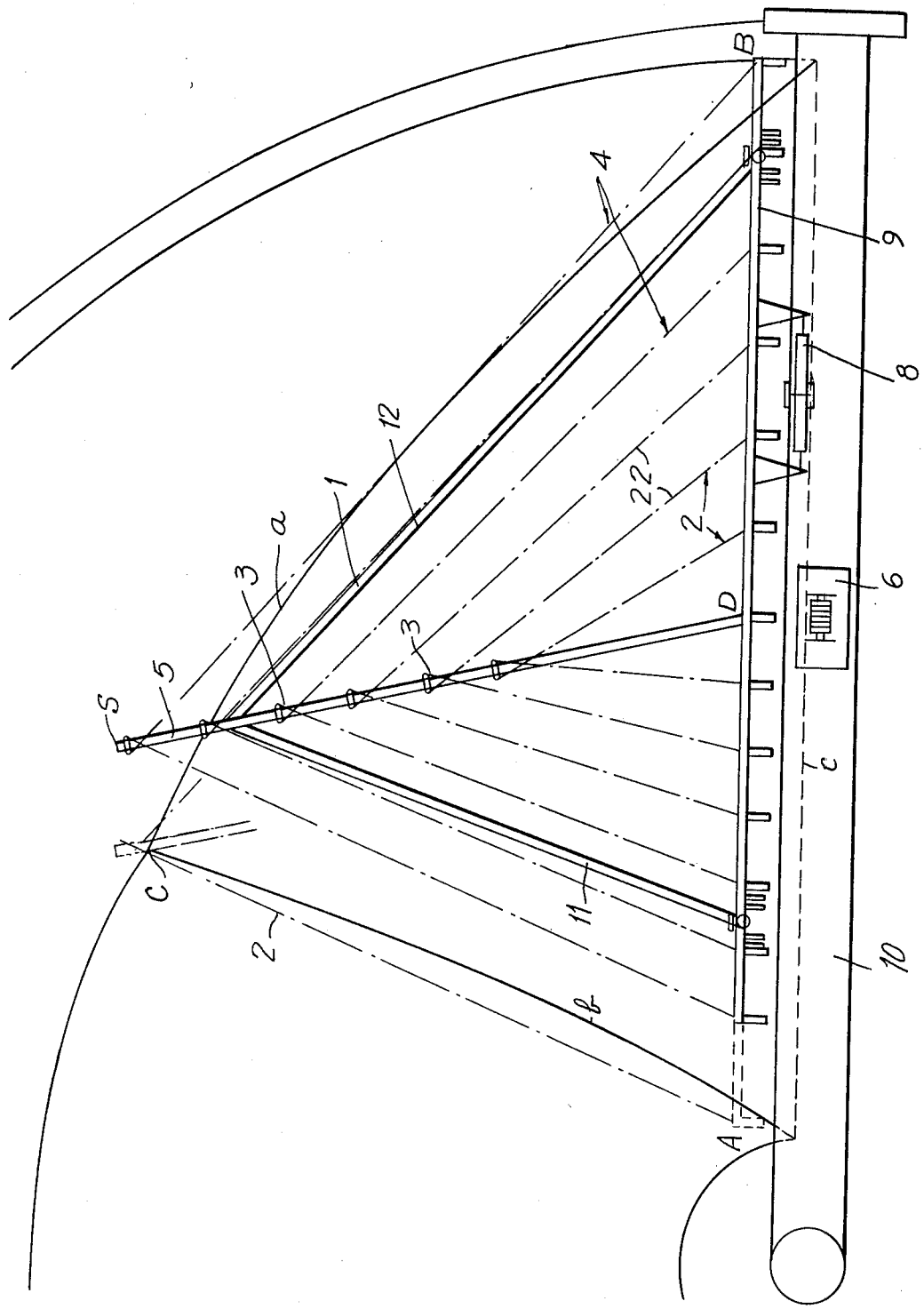
FIGS. 1 and 2 are diagrammatic top plan view showing a slope scraper-conveyor apparatus for scraping dumps which are arcuate and straight, respectively.

The slope scraper-conveyor apparatus shown in FIG. 1 serves to remove material from an arcuate dump and comprises a bridge 10, which is movable to be close to the dump end face from which material is to be removed. To that end, the bridge 10 is rotatable about an imaginary vertical axis disposed at the center of curvature of the dump. A transverse conveyor, not shown, is secured to that bridge. A carrier 9 is longitudinally slidably mounted on the bridge 10 and is parallel to the bridge and has a length which is approximately as large as the length of the base c of the substantially triangular end face of the dump. It is apparent from the drawing that the dump end face has an inner side b which faces the vertical axis and which may be smaller than the outer side a of the dump end face. A pole 5 protrudes upwardly from the carrier at a point D, which in the present example is offset from the middle of the carrier toward the shorter, inner side b by a distance which in the present case is less than one-tenth of the length of the carrier. The tip S of the pole is disposed on a higher level than the apex C of the dump end face or a dump ridge including said apex C. Tensioning devices 3 are secured to the pole at points which are spaced predetermined distances apart. The uppermost one of said tensioning devices is disposed slightly below the tip S. The carrier 9 comprises an inner section, which extends from the end A to the joint D at which the pole 5 is fixed, and an outer section, which extends from the joint D to the other end B of the carrier 9. These two sections need not differ in design. Fixing means for fixing the ends of ropes 2 are provided on the inner and outer carrier sections and at the ends of the carrier and are spaced predetermined distances apart. The number of rope-fixing means on each carrier section equals the number of tensioning devices 3. In the present case there are six rope-fixing means on each carrier section. A rope 2 extends from the outermost rope-fixing means of each carrier section, i.e., virtually from each carrier end, to the uppermost tensioning device; another rope extends from each of the next inner fixing means to the next lower tensioning device and so forth until a rope extends from that rope-fixing means which is nearest to the joint D to the lowermost tensioning device. The rope-fixing means on each carrier section may be spaced equal distances apart and the tensioning device may also be spaced equal distances apart.

The pole is connected to the carrier by two struts 11, 12, which form a common point, spaced from the tip S of the pole, extend to respective points which are spaced from respective carrier ends. The distance from the common point to the tip of the pole and the distance from each of said points of the carrier to the adjacent end thereof may be approximately the same. The carrier 9, the pole 5 and struts 11, 12 form a statically determinate frame 1, to which the tensioned ropes 2 are connected. The frame 1 and the ropes constitute the scraping means 4 of the slope scraper-conveyor apparatus which is being described.

It is apparent from the drawing that the two ropes extending from each tensioning device may constitute two sections 21, 22 of a single rope, which is trained around the tensioning device and may be slung in one turn around the same so that the tensions of the ropes can be equalized. The rope array is free of crossings because the tensioned ropes extending between the uppermost tensioning device and the ends of the carrier form a V-shaped configuration in which all other rope configurations, which are also V-shaped, are contained. The same is applicable to each of the lower rope configurations with respect to the others having apices on lower levels.

The scaping means 4 are adapted to be driven by a driver motor, e.g., a hydraulic or pneumatic actuator 8, which is connected to the carrier 9.

Figure 2:
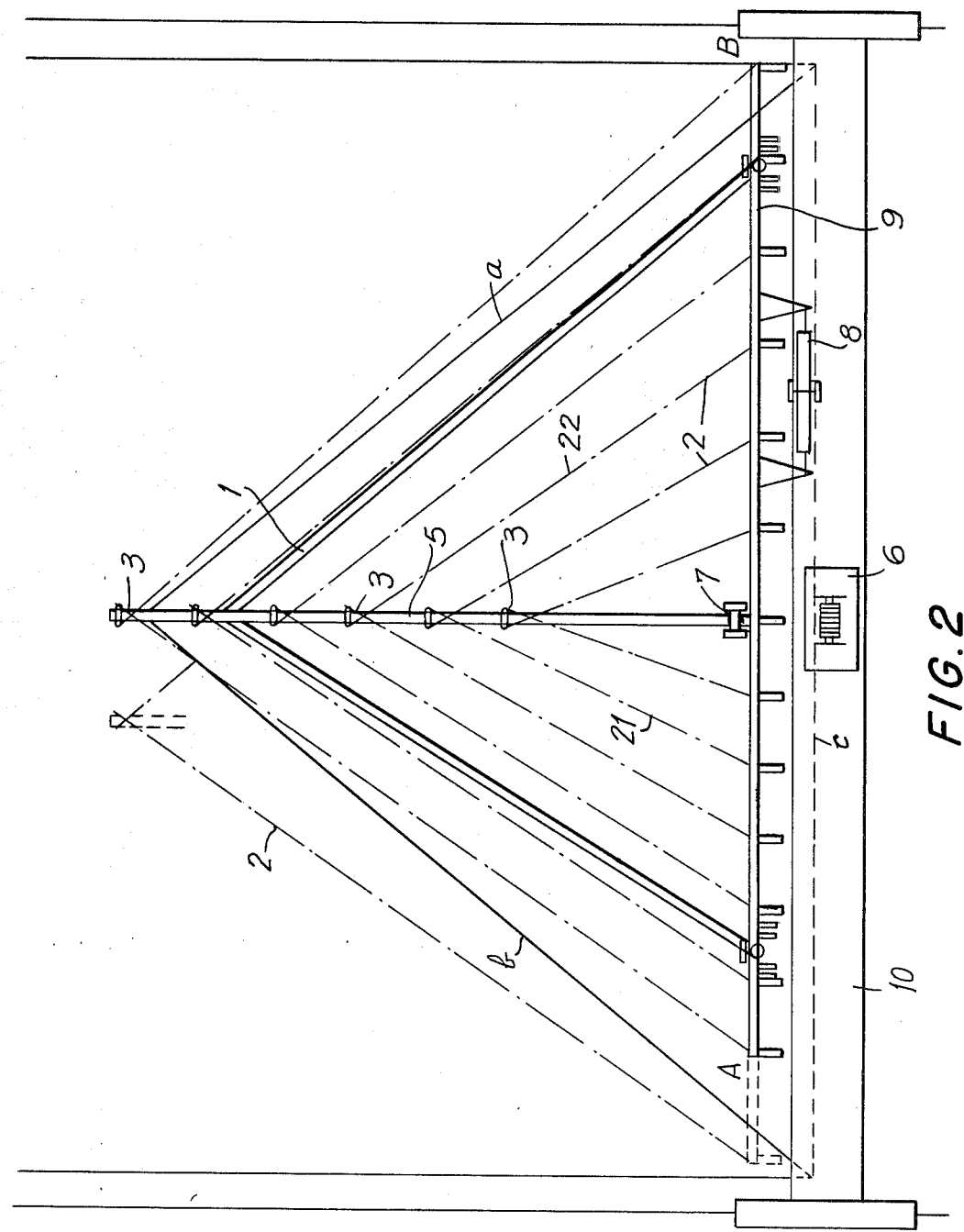

FIG. 2 shows a slope scraper-conveyor apparatus which serves to remove material from a prismatic dump of bulk material. For this reason, the bridge of that slope scraper is movable along the dump, from which material is to be removed at the dump end face having the configuration of a substantially isosceles triangle, which has sides a and b of equal length. The scraping means are substantially similar to those described hereinbefore, with the exception that the pole 5 is at right angles to the carrier 9. In FIGS. 1 and 2, the scraping means are indicated in dotted lines in one of their two end positions.

Figure 3:
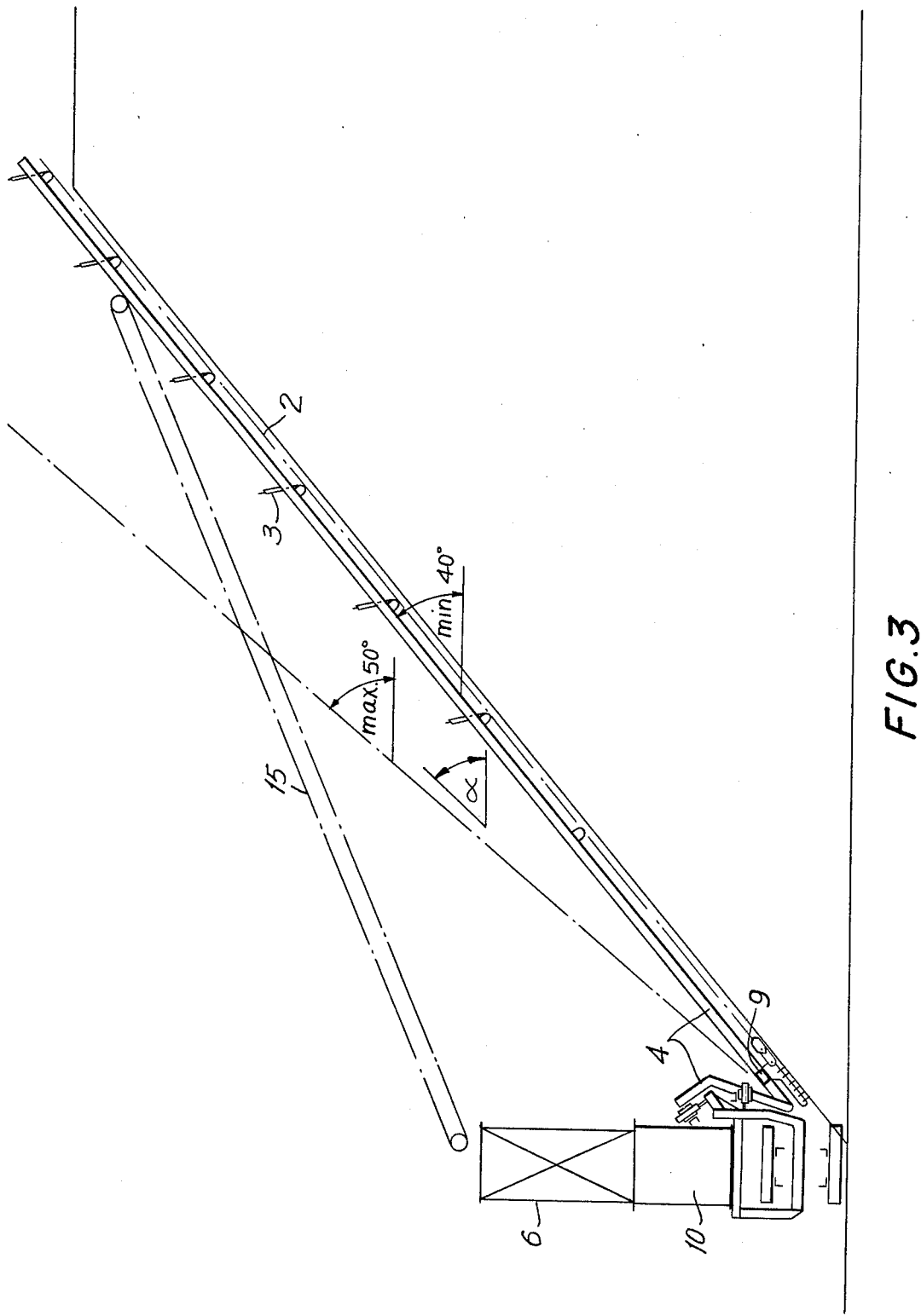
FIG. 3 shows a slope scraper-conveyor apparatus having scraping means which are adjustable relative to the horizontal.

In the embodiment shown in FIG. 3, the slope scraper-conveyor apparatus according to the invention comprises scraping means which are inclined from the horizontal by an angle $\alpha$ that is adjustable within an angular range of, e.g., 40 to 50 degrees. To that end, the frame of the scaping means is connected by a tension rope mechanism 15 to the upper end of a strand 6, which extends vertically from the bridge 10 approximately in the middle thereof. The inclination of the scraping means from the horizontal depends on the adjusted length of the tensioned rope. That length may be determined before the removal of bulk material from the dump begins and may be maintained as the removal of material proceeds. Because the distance between the tip of the frame of the scraping means 4 and the upper end of the strand is constant and the frame is reciprocable, the latter when moving from its middle position to either of its two end positions, where the angle $\alpha$ is minimized, is pivotally moved toward the stand about the pivot of the carrier by a relatively small angle. It is apparent that a pivotal movement having a limited amplitude is derived from and superposed on the reciprocating motion of the scraping means. Such pivotal movement is not detrimental in any case and in many cases may even promote the removal of material.

When bulk material which does not easily trickle is to be removed, the scraping means are desirably connected to a vibrator 7 and vibrated by the latter.

Slope scrapers according to the invention may be used not only to remove material dumps having triangular end faces but with the same advantages also to remove material from dumps having, e.g., trapezoidal end faces or cross-sections.

As the scraping means extend substantially throughout the dump end face from which material is to be removed, it will be sufficient to reciprocate the scraping means with a relatively small amplitude. That movement may be performed at a relatively high frequency. Close to the dump end face, the bulk material is removed at a substantially uniform rate so that the transverse conveyor is uniformly loaded. The rate at which bulk material is removed is much higher than with the known slope scraper-conveyor apparatus and this advantage is not offset by any drawback, e.g., a complicated structure. On the contrary, slope scrapers according to the invention are very simple in structure.

What is claimed is:

1. Apparatus for removing bulk material from a dump thereof, comprising:
   a bridge movable transversely to its longitudinal direction,
   a carrier extending in said longitudinal direction and mounted on said bridge to be movable in said longitudinal direction, said carrier having two opposite end points and a mid-point,
   an inclined pole connected to said carrier and extending upwardly to a top end of said pole from a point of said carrier which is nearer to said mid-point than to each of said end points,
   a plurality of lower rope holders on said carrier on opposite sides of said mid-point and spaced apart in said longitudinal direction,
   a plurality of ropes associated with and connected to respective ones of said lower rope holders,
   a plurality of vertically spaced apart upper rope holders secured to said pole and one of which is disposed near said top end and each of which is connected to two of said ropes which are connected to lower rope holders provided on opposite sides of said mid-point in such a manner that none of said ropes crosses another between said upper and lower rope holders, and
   drive means for reciprocating said carrier in said longitudinal direction.

2. Apparatus as set forth in claim 1, and being operable to remove bulk material from a sloping end face of said dump, said end face having a height up to a predetermined upper level and wherein
   said bridge and carrier extend substantially throughout the length of the base of said end face, and
   said ropes contact said end face and are arranged to scrape bulk material from said end face in response to the reciprocation of said carrier by said drive means and
   said pole extends above said upper level.

3. Apparatus as set forth in claim 2, including a conveyor mounted on said bridge and adapted to receive bulk material which has thus been scraped from said end face by said ropes and to carry said bulk material in said longitudinal direction.

4. Apparatus as set forth in claim 2, and being operable to remove bulk material from a sloping end face of said dump and in which said pole has an inclination which is adjustable to conform to the slope of said end face.

5. Apparatus as set forth in claim 1, wherein said upper rope holders constitute rope-tensioning devices.

6. Apparatus as set forth in claim 1, wherein at least one diagonal strut is secured to said pole and to said carrier.

7. Apparatus as set forth in claim 1, wherein each of two struts is secured to said pole and is secured to said carrier on opposite sides of said mid-point.

8. Apparatus as set forth in claim 7, wherein
   said pole is secured to said carrier at a point which is spaced from said mid-point by not more than one-tenth of the length of said pole,
   said two struts are secured to said pole at a common point thereof and are secured to said carrier near respective lower rope holders nearest to said end points, and
   said lower rope holders being disposed between said mid-point and each of said end points being substantially equally spaced apart.

9. Apparatus as set forth in claim 1, wherein the two ropes connected to each of said upper rope holders are integrally connected to and by a rope portion trained around said upper rope holder.

10. Apparatus as set forth in claim 1, wherein said pole is pivoted to said bridge about an axis which is parallel to said longitudinal direction,
    an approximately vertical, rigid stand is mounted on said bridge, and
    a connecting element connects said stand at its top end to a point of said pole spaced above said carrier.

11. Apparatus as set forth in claim 10, wherein said connecting element comprises a strut.

12. Apparatus as set forth in claim 10, wherein said connecting element comprises a rope.

13. Apparatus as set forth in claim 10, wherein
    said carrier is hinged to said bridge on said axis and said pole is rigid with said carrier.

14. Apparatus as set forth in claim 1, wherein said connecting element is adjustable in length.

15. Apparatus as set forth in claim 1, including a vibrator operable to vibrate said carrier.

16. Apparatus as set forth in claim 1, including toothed transverse rods connecting at least part of said ropes.

* * * * *